United States Patent
Han et al.

(10) Patent No.: US 12,025,471 B2
(45) Date of Patent: ***Jul. 2, 2024

(54) SYSTEMS AND METHODS FOR ESTIMATING A DIFFERENCE IN HEIGHT BETWEEN TWO FLOORS IN A BUILDING FOR USE IN ESTIMATING A HEIGHT OR AN ALTITUDE OF ONE OF THE TWO FLOORS

(71) Applicant: NextNav, LLC, Sunnyvale, CA (US)

(72) Inventors: Guiyuan Han, San Jose, CA (US); Badrinath Nagarajan, Cupertino, CA (US); Michael Dormody, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,714

(22) Filed: Sep. 13, 2022

(65) Prior Publication Data

US 2023/0003520 A1   Jan. 5, 2023

Related U.S. Application Data

(63) Continuation of application No. 16/364,827, filed on Mar. 26, 2019, now Pat. No. 11,460,298.
(Continued)

(51) Int. Cl.
*G01C 5/06* (2006.01)
*G01C 21/20* (2006.01)
*H04W 64/00* (2009.01)

(52) U.S. Cl.
CPC ............. *G01C 5/06* (2013.01); *G01C 21/206* (2013.01); *H04W 64/003* (2013.01)

(58) Field of Classification Search
CPC ........ G01C 5/06; G01C 21/206; G01C 25/00; G01C 21/20; G01C 21/005; G01C 5/00;
(Continued)

(56) References Cited

U.S. PATENT DOCUMENTS

| 8,130,141 B2 | 3/2012 | Pattabiraman et al. |
| 9,057,606 B2 | 6/2015 | Wolf et al. |

(Continued)

FOREIGN PATENT DOCUMENTS

| CN | 101379367 A | 3/2009 |
| CN | 105683708 A | 6/2016 |
| CN | 107923743 A | 4/2018 |

OTHER PUBLICATIONS

Form PCT/ISA/220, PCT/US2019/024023, "Notification of Transmittal of the International Search Report and the Written Opinion of the International Searching Authority, or the Declaration", 1 page(s); Form PCT/ISA/210, PCT/US2019/024023, "International Search Report", 3 page(s); EPO, PCT/US2019/024023, "Information on Search Strategy", 1 page(s); Form PCT/ISA/237, PCT/US2019/024023, "Written Opinion of the International Searching Authority", 8 page(s), dated Jun. 28, 2019.
(Continued)

*Primary Examiner* — Yoshihisa Ishizuka
*Assistant Examiner* — Carter W Ferrell
(74) *Attorney, Agent, or Firm* — MLO, a professional corp.

(57) ABSTRACT

Estimating a difference in height between floors in a building for use in estimating a height or an altitude of one of the floors. A height difference is estimated between a first floor and a second floor based on outdoor temperatures of first and second time periods, an indoor temperature of the first or second time period, and first and second estimated differences in height between the first and second floors that is
(Continued)

based on measurements of pressure from mobile devices when the mobile devices were on the first and second floors during the first and second time periods.

14 Claims, 11 Drawing Sheets

Related U.S. Application Data

(60) Provisional application No. 62/716,760, filed on Aug. 9, 2018.

(58) Field of Classification Search
CPC .... G01C 21/165; H04W 4/029; H04W 64/00; H04W 4/33; H04W 4/024; H04W 4/02; H04W 64/003; H04W 4/021; H04W 4/025; H04W 4/90; H04W 4/38; G01S 5/0252; G01S 5/0263; G01S 19/46; G01S 19/48; G01S 5/021
See application file for complete search history.

(56) References Cited

U.S. PATENT DOCUMENTS

| | | | |
|---|---|---|---|
| 9,237,423 B1* | 1/2016 | Blaha, Jr. | H04W 4/025 |
| 9,980,246 B2 | 5/2018 | Pattabiraman et al. | |
| 2017/0195984 A1* | 7/2017 | Dormody | G01C 5/06 |
| 2017/0223509 A1* | 8/2017 | Han | F24F 11/62 |
| 2017/0280301 A1 | 9/2017 | Chang et al. | |
| 2018/0003494 A1 | 1/2018 | Fleming | |
| 2019/0313219 A1* | 10/2019 | Zhu | H04W 4/021 |

OTHER PUBLICATIONS

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

Ghaderi et al., "Deep Forecast: Deep Learning-based Spatio-Temporal Forecasting", ICML 2017 Time Series Workshop, Sydney, Australia, 2017, 6 pages.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

Notice of Allowance and Fees dated May 31, 2022 for U.S. Appl. No. 16/364,827.

Office Action dated Dec. 17, 2021 for U.S. Appl. No. 16/364,827.

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Office Action dated Aug. 3, 2022 for China Patent Application No. 201980052014.9.

Office Action dated Feb. 15, 2023 for European Patent Office Patent Application No. 19716686.1.

Office Action dated Feb. 24, 2023 for China Patent Application No. 201980052014.9.

* cited by examiner

SYSTEMS AND METHODS FOR ESTIMATING A DIFFERENCE IN HEIGHT BETWEEN TWO FLOORS IN A BUILDING FOR USE IN ESTIMATING A HEIGHT OR AN ALTITUDE OF ONE OF THE TWO FLOORS

CROSS-REFERENCE TO RELATED APPLICATIONS

This application is a continuation of U.S. patent application Ser. No. 16/364,827, filed Mar. 26, 2019, which claims priority to U.S. Provisional Patent Application No. 62/716,760, filed Aug. 9, 2018, all of which are hereby incorporated by reference herein in their entirety.

TECHNICAL FIELD

Aspects of this disclosure generally pertain to positioning of mobile devices.

BACKGROUND

Mobile devices (e.g., smart phones) are widely used in urban environments. Estimated locations of mobile devices can be used to determine characteristics of buildings in the urban environments. One such characteristic is an unknown height of a floor in a building relative to ground terrain. The unknown height of the floor can be estimated using crowdsourced, estimated altitudes of mobile devices when those mobile devices were located on the floor. Different technologies may be used to compute each estimated altitude of a mobile device. One system for estimating altitudes of mobile device is illustrated in FIG. 1. As shown, the system includes a mobile device 120 and at least one reference atmospheric sensor 130. An estimate of an altitude of a mobile device ($h_{mobile}$) can be computed by any processor that receives appropriate information (e.g., the mobile device 120 or a server) as follows:

$$h_{mobile} = h_{ref} - \frac{R \times T_{ref}}{g \times M} \ln\left(\frac{P_{ref}}{P_{mobile}}\right), \quad \text{(Equation 1)}$$

where $P_{mobile}$ is a measurement of pressure at the location of the mobile device 120 (e.g., determined by a pressure sensor of the mobile device 120), $h_{ref}$ is a reference altitude, $P_{ref}$ is a reference pressure determined for the reference altitude, $T_{ref}$ is an estimate of temperature (e.g., in Kelvin) at a location of a remote temperature sensor (e.g., of the network reference atmospheric sensor 130), g corresponds to the acceleration due to gravity, R is a gas constant known in the art, and M is molar mass of air (e.g., dry air or other type of ambient air known in the art). The minus sign (−) may be substituted with a plus sign (+) in alternative embodiments of Equation 1, as would be understood by one of ordinary skill in the art. The reference altitude $h_{ref}$ may be any altitude, and is often set at mean sea-level altitude, but may also be set to an altitude of ground terrain in an environment near the mobile device 120. The reference pressure $P_{ref}$ may be determined as follows:

$$P_{ref} = P_{sensor} \exp\left(-\frac{g \times M \times (h_{ref} - h_{sensor})}{R \times T_{ref}}\right), \quad \text{(Equation 2)}$$

where $P_{sensor}$ is an estimate of pressure at the location of a remote pressure sensor (e.g., of the network reference atmospheric sensor 130), and $h_{sensor}$ is a known altitude of the remote pressure sensor (e.g., of the network reference atmospheric sensor 130). When two or more reference pressures are available (e.g., based on two or more measurements of pressure from two or more corresponding network atmospheric sensors), the reference pressures are combined into a single reference pressure value (e.g., using an average, weighted average, or other suitable combination of the reference pressures), and the single reference pressure value is used for the reference pressure $P_{ref}$.

When the mobile device 120 is located on a floor in a building 190, the estimated altitude of the mobile device 120 ($h_{mobile}$) can be used to estimate an altitude of that floor by assuming the mobile device 120 is positioned at a typical height (e.g., one meter) above the surface of the floor, and subtracting the typical height from the estimated altitude of the mobile device 120 ($h_{mobile}$) to result in a possible altitude of the floor. This process can be repeated for many estimated altitudes of many mobile devices, and a combination (e.g., an average) of the estimated altitudes can be used as an altitude estimate of the floor. Thus, a crowdsourcing approach can be used to estimate altitudes of floors in a building by mapping representative altitudes of clustered estimates of mobile device altitudes to different floors. The height of each floor above a ground-level floor of the building can be determined by subtracting an altitude of the ground-level floor from the representative altitude of that floor.

By way of illustration, FIG. 2 includes a visual depiction of how different clusters of estimated mobile device altitudes (e.g., the groups of dots between horizontal lines) can be used to determine representative estimated altitudes for the clusters (e.g., the stars among the dots), which may be used to estimate the altitude of a floor or a height above a ground-level floor in a building (e.g., the horizontal lines). In practice, clusters of estimated altitudes of mobile devices are identified (e.g., preferably for each floor in a building), a cluster number is determined for each cluster, and an altitude of the cluster is determined as the center of each cluster. Usually, an altitude of a ground-level floor is publicly or otherwise available, and a height difference between (i) the representative altitude of the cluster for the ground-level floor and (ii) a representative altitude of a cluster for another floor in the building is the height of the other floor relative to the ground-level floor. This process is repeated for different clusters to determine different heights of different floors relative to the ground-level floor. Alternatively, if a height of any floor above ground terrain in the vicinity of a building is known, a difference between representative altitudes of that floor and another floor can be combined with (e.g., added to or subtracted from) that known height to the height of the other floor above the ground terrain.

Many different methods of data clustering can be used, including but not limited to a K-means clustering method and a mean-shift clustering method. The choice of cluster method may depend on known and unknown conditions (e.g., a K-means clustering methods may need to know the cluster numbers and may only apply to an even cluster size, so it may not be applicable for some cases).

Ideally, as illustrated by FIG. 2, altitudes reported by mobile devices when residing on a floor inside a building are highly-accurate and representative of true altitudes. Thus, the results of clustering will provide a floor number (i.e., a cluster number) as well as a reliable estimate of the altitude of the floor, which can be used to determine a height of the floor above ground terrain.

The accuracy of an estimated altitude of a mobile device when computed using Equation 1 depends on whether the measurement of pressure from the mobile device reflects true outdoor pressure at the altitude of the mobile device. Unfortunately, altitudes reported by mobile devices while inside a building can be impacted by artificial pressurization and stack effect from building effects inside the building, where the measurement of pressure by a mobile device when the mobile device is at a given altitude is not equal to actual pressure at that given altitude outside the building, which leads to inaccurate estimated altitudes.

One building effect is a heating, ventilation, and air conditioning (HVAC) effect, which causes sudden or continuous and significant pushing or pulling of pressure (e.g., from a deliberate over-pressurization or under-pressurization) at a given altitude in the building while a similar push or pull of pressure does not occur at the given altitude outside the building. An HVAC effect typically pressurizes or depressurizes a building to cause a pressure shift inside the building relative to outside pressure. An altitude mapping on the floors can resolve the magnitude of any pressure shift caused by HVAC effect. Normally, an altitude of the ground-level floor of the building and/or an altitude of the top floor of the building can be obtained from public or other sources (e.g., a terrain height or building height database). If HVAC effect is strong enough to cause an estimated altitude that does not align with the known altitude for a floor (e.g., an estimated altitude above outside a boundary of a building), then the magnitude of any pressure shift can be identified by comparing the estimated altitude with the known altitude of the floor, and all other estimated altitudes for all other floors can be shifted based on the difference.

Another building effect is a stack/chimney effect, which is the focus of this disclosure. The stack effect is typically characterized by a building's leakiness, which affects a pressure profile of a building based on a difference between temperature inside the building and a temperature outside the building. By way of illustration, FIG. 3 includes a visual depiction of estimated altitudes of mobiles devices that are based on measurements of pressure from inside a building that is influenced by a stack effect. For purposes of illustration and comparison, the dots in FIG. 2 are assumed to be true altitudes, and the dots in FIG. 3 are estimates of those true altitudes. As can be seen by comparison of these figures, each cluster number can still represent a floor number, but the distances between clusters in FIG. 3 are different than the distances between clusters in FIG. 2. As a result, the distances between clusters in FIG. 3 are unreliable for use in determining heights of floors relative to a ground-level floor when the temperature inside the building and the temperature outside the building differ—i.e., when a stack effect is present inside a building, a distance between the center of a cluster of estimated altitudes for a ground-level floor and the center of a cluster of estimated altitudes for another floor is not the true height of the other floor relative to ground truth. Thus, when estimated altitudes of mobile devices are used to determine relative differences in altitude between floors in a building that has an unknown stack effect, solutions are needed to improve the accuracy of the determined differences in altitude. In the disclosure that follows, systems and methods for estimating a difference in height between two floors in a building for use in estimating a height or an altitude of one of the two floors regardless of stack effects in the building over time are described.

DETAILED DESCRIPTION

Described below are systems and methods for estimating a difference in height between two floors in a building for use in estimating a height or an altitude of one of the two floors regardless of stack effects in the building over time.

Figure 1:
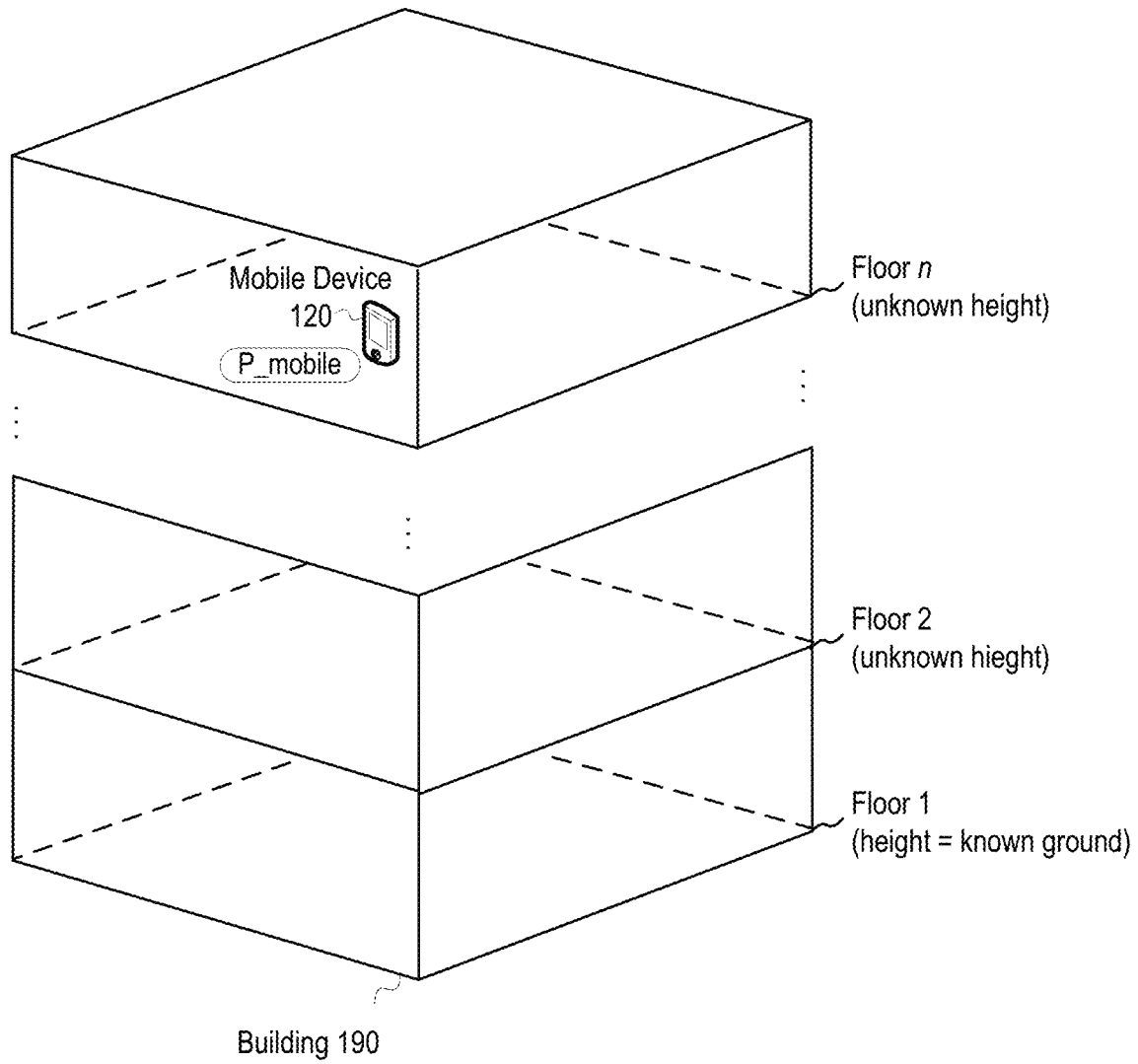
FIG. 1 shows a system for estimating an altitude of a mobile device.
Figure 3:
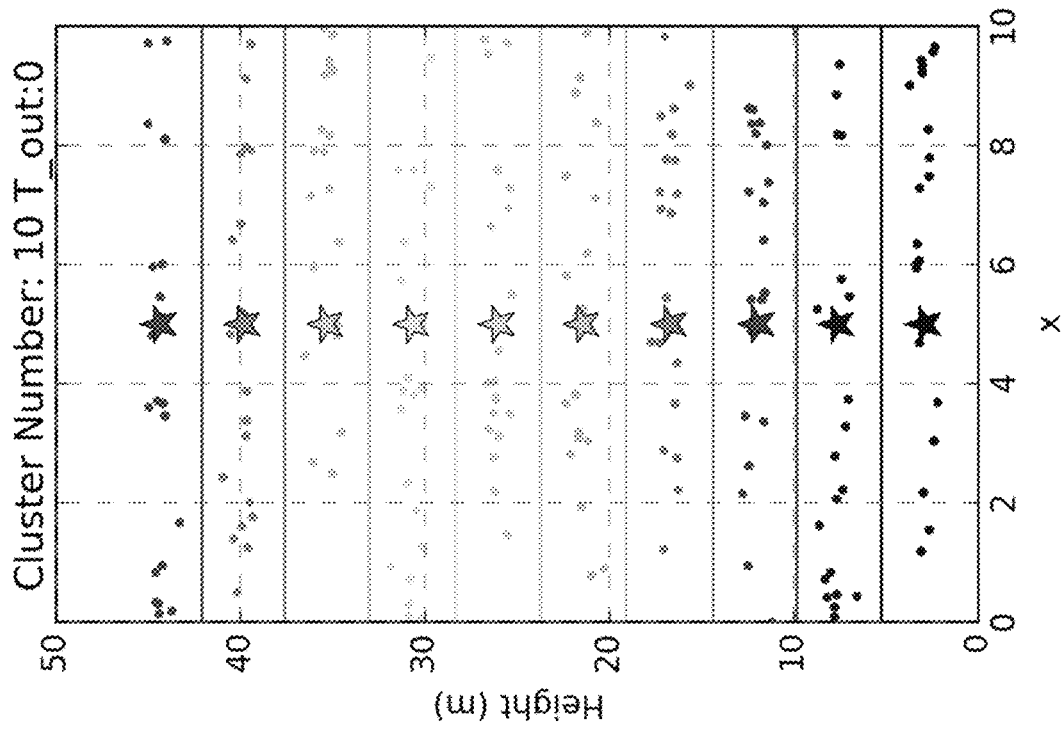
FIG. 3 provides a visual depiction of estimated altitudes of mobiles devices that are based on measurements of pressure from inside a building that is influenced by a stack effect.
Figure 2:
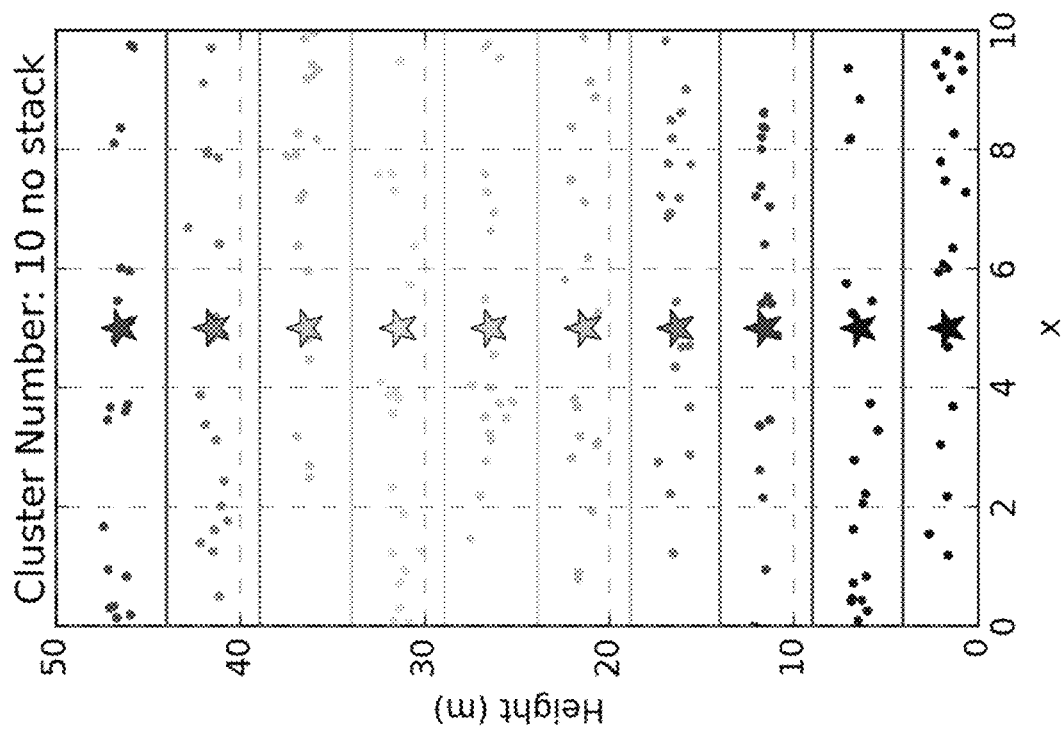
FIG. 2 provides a visual depiction of how a cluster of estimated mobile device altitudes can be used to determine a representative estimated altitude for the cluster, which may be used to estimate the height or altitude of a floor in a building.
Figure 4:
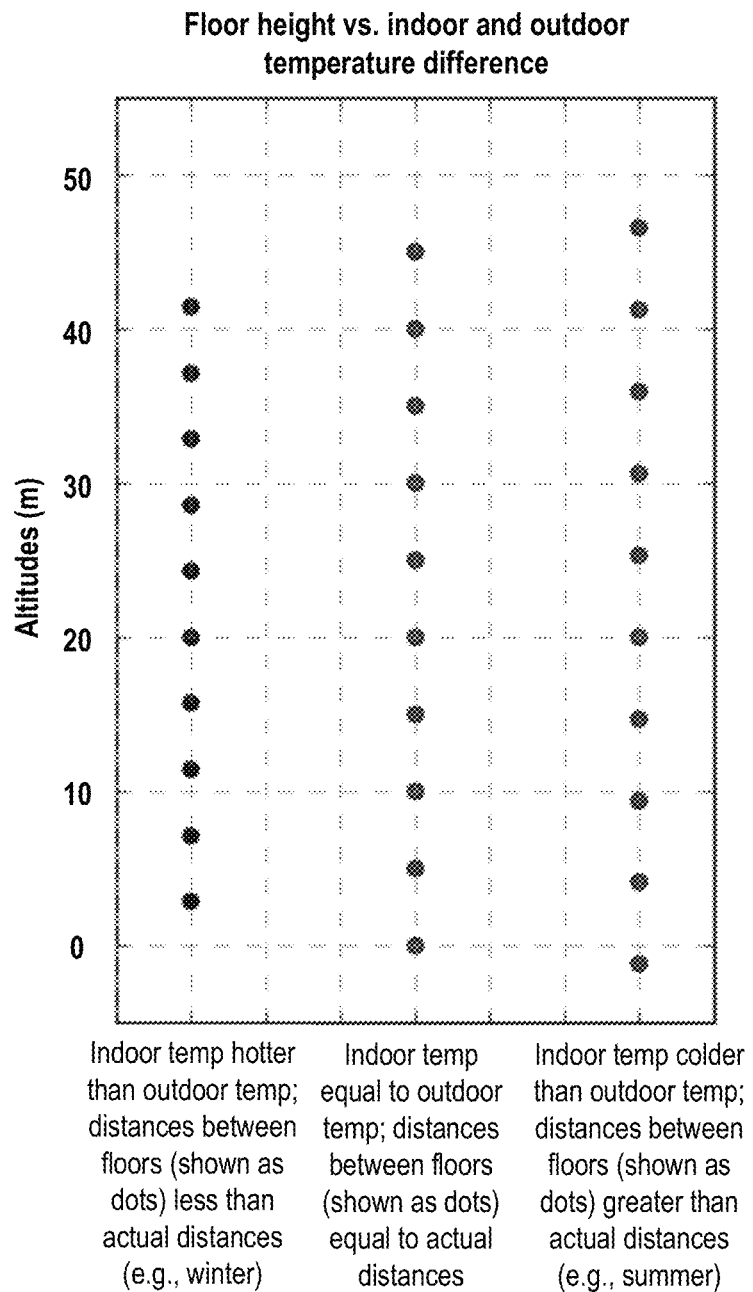
FIG. 4 illustrates how distances between estimated altitudes of floors inside a building differ depending on different types of stack effect in the building.

As illustrated in the Background section of this disclosure, during a given time period, presence of a stack effect limits the usefulness of estimated mobile device altitudes for determining true altitudes of floors in a building that can be used to determine heights of those floors relative to known ground altitude. By way of example, FIG. 4 illustrates how distances between estimated altitudes of floors inside a building differ depending on different types of stack effect in the building. The magnitude of pressure difference caused by stack effect is a function of temperature difference, user true altitude, leakiness of the building, and a height of neutral pressure level (NPL). Therefore, when temperature differences vary, pressure differences due to stack effect are different and contribute different pressure difference (dP) into the altitude estimation. As FIG. 4 illustrates, when the temperature inside the building is colder or hotter than the temperature outside the building, distances between estimated altitudes of floors are different than actual distances between the floors. In general, tighter spacing between estimated altitudes is caused by an indoor temperature that is hotter than outdoor temperature. For example, when indoor temperature is hotter than outside temperature, such as during winter, indoor air is comparatively lighter than outdoor air and rises towards the top of a building making pressure at the top of building higher compared to outdoor pressure at the same altitude, which results in the estimated altitude at the top of the building being lower than the true altitude. Pressure at the bottom of the building would be lower than outdoor pressure for that altitude, which results in the estimated altitude at the bottom of the building being higher than the true altitude. However, when the temperature inside the building is equal to the temperature outside the building, there is no stack effect and the distances between accurate estimated altitudes of the floors are equal to actual distances between the floors.

As discussed further below, clusters of estimated altitudes or measurements of indoor pressure can be collected during different time periods (e.g., a first time period during a first combination of indoor temperature and outdoor temperature, and a second time period during a second combination of indoor temperature and outdoor temperature). The collected clusters of each time period can used to determine a difference in height between two floors for that time period, and a more accurate height difference between the two floors can be determined using the determined differences in height, the outdoor temperatures of the two time periods, and a third temperature value that represents circumstances when indoor and outdoor temperatures are equal.

The pressure difference (dP) between a first floor and a second floor in a building contains the true pressure difference between two floors (e.g., $P_{true1} - P_{true2}$) and also any pressure difference caused by a stack effect (SE) (e.g., $P_{SE1} - P_{SE2}$), as shown below:

$$dP = (P_{true1} + P_{SE1}) - (P_{true2} + P_{SE2}) \qquad \text{(Equation 3)},$$

which can be rearranges as follows:

$$dP = dP_{true} + dP_{SE} = (P_{true1} - P_{true2}) + (P_{SE1} - P_{SE2}) \qquad \text{(Equation 4)},$$

where $P_{true1}$ and $P_{true2}$ are true pressures respectively at the first floor and the second floor, $P_{SE1}$ and $P_{SE2}$ are pressure differences between indoor and outdoor pressures respectively at the first floor and the second floor, as caused by a stack effect of the building.

A pressure difference ($dP_{SEn}$) between indoor pressure and outdoor pressure caused by stack effect for an nth floor can be represented as follows:

$$dP_{SEn} = A(h_n - h_{NPL})(1/T_{out} - 1/T_{in}) \qquad \text{(Equation 5)},$$

where A is a parameter representing a building leakiness characteristic, $h_n$ is the true height of the nth floor, $h_{NPL}$ is the height at which neutral pressure level occurs (e.g., where indoor and outdoor pressure are equal regardless of temperature difference between indoor and outdoor), and $T_{out}$ and $T_{in}$ are outdoor and indoor temperatures at a given time.

In most outdoor environments, outside temperatures at different floor levels of a building are the same or minimally different (e.g., varying less than 1 degrees Kelvin), so an assumption can be made that $T_{out}$ is the same for each floor during a time period. Similarly, temperatures at different floor levels inside a building are often the same or minimally different (e.g., varying at most by 1-2 degrees Kelvin), so an assumption can be made that $T_{in}$ is the same for each floor in a building during the time period. In some embodiments, whether the assumption that $T_{in}$ is the same for each floor in a building during the time period is made can be based on a threshold test. For example, an estimated temperature difference between two measured floor temperatures can be determined before a determination is made as to whether the two temperatures are within a threshold amount of temperature ($T_{thresh}$) from each other. By way of example, $T_{thresh}$ may equal 2 degrees Kelvin or less. If the two temperatures are within the threshold amount of temperature $T_{thresh}$ of each other, then the assumption can be made that $T_{in}$ is the same for the two floors in the building during a time period.

If not, then the assumption is not made, and pressure data for both floors is not used to estimate a difference in altitude between the floors.

A combination of Equation 4 and Equation 5 results in the following:

$$dP = dP_{true} + A \times (h_1 - h_2) \times (1/T_{out} - 1/T_{in}) \qquad \text{(Equation 6)},$$

where $h_1$ is the true altitude of the first floor and $h_2$ is the true altitude of the second floor. At least one of these altitudes is unknown—e.g., if the first floor is a ground-level floor, its altitude may be available from a data source (e.g., a terrain database).

The correlation between pressure difference (dP) and estimated height difference (dh) during a time period of constant outdoor temperature can be represented as follows:

$$dP = -\frac{g \times M \times P}{R \times T} \times dh, \qquad \text{(Equation 7)}$$

where dP is a pressure difference between two floors, dh is a distance between estimated altitudes of the two floors as impacted by a stack effect of the building, P is an outdoor reference pressure at a reference altitude, T is an outdoor reference temperature, g corresponds to the acceleration due to gravity, R is a gas constant, and M is molar mass of air (e.g., dry air or other).

Combining Equation 6 and Equation 7 yields:

$$-\frac{g \times M \times P}{R \times T_{out}} \times dh = \Delta P_{true} + A \times (h_1 - h_2) \times \left(\frac{1}{T_{out}} - \frac{1}{T_{in}}\right), \qquad \text{(Equation 8)}$$

where $(h_1 - h_2)$ is not known.

As demonstrated below, differences between data clusters for the same floors, but for different time periods, can be used to determine the unknown height difference between the floors $(h_1 - h_2)$.

In a first step, a first data cluster for a first floor and a first data cluster for a second floor is determined based on a first outdoor temperature $T_{out1}$ measured during a first time period, and a first height difference $dh_1$ between the two data clusters is determined. The resultant information may be input into a version of Equation 8 for the first time period as follows:

$$-gMP_1/RT_{out1} \times dh_1 = \Delta P_{true} + A \times (h_1 - h_2) \times (1/T_{out1} - 1/T_{in1}) \qquad \text{(Equation 9)},$$

where $P_1$ is an outdoor reference pressure for the first time period (e.g., mean sea-level pressure).

In a second step, a second data cluster for the first floor and a second data cluster for the second floor is determined based on a second outdoor temperature $T_{out2}$ measured during a second time period, and a second height difference $dh_2$ between the two data clusters is determined. The resultant information may be input into a version of Equation 8 for the second time period as follows:

$$-gMP_2/RT_{out2} \times dh_2 = \Delta P_{true} + A \times (h_1 - h_2) \times (1/T_{out2} - 1/T_{in2}) \qquad \text{(Equation 10)},$$

where $P_2$ is an outdoor reference pressure for the second time period (e.g., mean sea-level pressure).

In a third step, the true difference in pressure between the first and second floors ($\Delta P_{true}$) of Equation 9 and Equation 10 can be assumed to be equal, and the indoor temperatures during the two time periods ($T_{in1}$ and $T_{in2}$) are determined to be equal to each other or within the previously-described threshold amount of temperature T thresh from each other, which permits combination of Equation 9 and Equation 10 as follows:

$$\frac{\frac{dh_2 \times P_2}{T_{out2}} - \frac{dh_1 \times P_1}{T_{out1}}}{\frac{1}{T_{out1}} - \frac{1}{T_{out2}}} = \frac{A \times (h1 - h2) \times R}{g \times M}, \quad \text{(Equation 11a)}$$

Of course, if the two indoor temperatures are different, Equation 11a and the equations that follow can be modified to include the two indoor temperatures as illustrated below:

$$\frac{\frac{dh_2 \times P_2}{T_{out2}} - \frac{dh_1 \times P_1}{T_{out1}}}{\Delta T_1 - \Delta T_2} = \frac{A \times (h1 - h2) \times R}{g \times M}, \quad \text{(Equation 11b)}$$

where $$\Delta T_1 \text{ is } \frac{1}{T_{out1}} - \frac{1}{T_{in1}}, \Delta T_2 \text{ is } \frac{1}{T_{out2}} - \frac{1}{T_{in2}}.$$

The right side of Equation 11a and Equation 11b includes constants that are the same for the first time period and the second time period, including the true difference in height between the two floors, which is treated as a third height difference $dh_3$ when indoor and outdoor temperature are the same. Repeating Equation 11a and Equation 11b from above for the third height difference $dh_3$ in place of the second height difference $dh_2$, a hypothetical outdoor reference pressure $P_3$ (e.g., mean sea-level pressure) in place of the outdoor reference pressure for the second time period $P_2$, and a third outdoor temperature $T_{out3}$ in place of the second outdoor temperature $T_{out2}$, yields the following:

$$\frac{\frac{dh_3 \times P_3}{T_{out3}} - \frac{dh_1 \times P_1}{T_{out1}}}{\frac{1}{T_{out1}} - \frac{1}{T_{out3}}} = \frac{A \times (h1 - h2) \times R}{g \times M}, \quad \text{(Equation 12a)}$$

and $$\frac{\frac{dh_3 \times P_3}{T_{out3}} - \frac{dh_1 \times P_1}{T_{out1}}}{\Delta T_1 - \Delta T_3} = \frac{A \times (h1 - h2) \times R}{g \times M}. \quad \text{(Equation 12b)}$$

where $\Delta T_1$ is $1/T_{out1} - 1/T_{in1}$, and $\Delta T_3$ is $1/T_{out3} - 1/T_{in3}$. The third height difference $dh_3$ is unknown, and can be solved by combining Equation 11a and Equation 12a to achieve Equation 13a, or by combining Equation 11b and Equation 12b to achieve Equation 13b, as follows:

$$\frac{\frac{dh_2 \times P_2}{T_{out2}} - \frac{dh_1 \times P_1}{T_{out1}}}{\frac{1}{T_{out1}} - \frac{1}{T_{out2}}} = \frac{\frac{dh_3 \times P_3}{T_{out3}} - \frac{dh_1 \times P_1}{T_{out1}}}{\frac{1}{T_{out1}} - \frac{1}{T_{out3}}}, \quad \text{(Equation 13a)}$$

and $$\frac{\frac{dh_2 \times P_2}{T_{out2}} - \frac{dh_1 \times P_1}{T_{out1}}}{\Delta T_1 - \Delta T_2} = \frac{\frac{dh_3 \times P_3}{T_{out3}} - \frac{dh_1 \times P_1}{T_{out1}}}{\Delta T_1 - \Delta T_3}. \quad \text{(Equation 13b)}$$

Selection of the third outdoor temperature $T_{out3}$ is based on there being no stack effect—i.e., when indoor temperature equals outdoor temperature such that indoor measurements of pressure on the first and second floors would be representative of respective outdoor pressures. Thus, the third outdoor temperature $T_{out3}$ is preferably selected to be equal to the first indoor temperature $T_{in1}$, or some combination of the first indoor temperature $T_{in1}$ and the second indoor temperature $T_{in2}$ when those values are different (e.g., an average of the two values). In an alternative embodiment, the third outdoor temperature $T_{out3}$ can set to another possible indoor temperature for the building.

Rearranging Equation 13a and Equation 13b yields a solution for determining the third height difference $dh_3$ as follows:

$$dh_3 = \frac{dh_1 \times P_1 \times T_{out3} - \frac{dh_1 \times P_1 \times T_{out2} - dh_2 \times P_2 \times T_{out1}}{T_{out2} - T_{out1}} \times (T_{out3} - T_{out1})}{P_3 \times T_{out1}}, \quad \text{(Equation 14a)}$$

and $$dh_3 = \frac{dh_1 \times P_1 \times T_{out3} - \frac{dh_1 \times P_1 \times T_{out2} - dh_2 \times P_2 \times T_{out1}}{T_{out2} \times T_{out1} \times (\Delta T_1 - \Delta T_2)} \times (\Delta T_1 - \Delta T_3) \times T_{out3} \times T_{out1}}{(P_3 \times T_{out1})}. \quad \text{(Equation 14b)}$$

Since the fluctuation of mean sea-level pressure is normally only a few percent of its total number (e.g., ≤3%), the outdoor reference pressures $P_1$, $P_2$, and $P_3$ from Equation 14a and Equation 14b will be numerically very close, and can therefore be mathematically cancelled to result in the following:

$$dh_3 = \frac{dh_1 \times T_{out3} - \frac{dh_1 \times T_{out2} - dh_2 \times T_{out1}}{T_{out2} - T_{out1}} \times (T_{out3} - T_{out1})}{T_{out1}}, \quad \text{(Equation 15a)}$$

and $$dh_3 = \frac{dh_1 \times T_{out3} - \frac{dh_1 \times T_{out2} - dh_2 \times T_{out1}}{T_{out2} \times T_{out1} \times (\Delta T_1 - \Delta T_2)} \times (\Delta T_1 - \Delta T_3) \times T_{out3} \times T_{out1}}{T_{out1}} \quad \text{(Equation 15b)}$$

which permits the unknown third height difference $dh_3$ to be solved. Alternatively, the hypothetical outdoor reference pressure $P_3$ could be based on the outdoor reference pressure for the first time period $P_1$ and/or the outdoor reference pressure for the second time period $P_2$ (e.g., equal to one of the outdoor reference pressures; e.g., a combination of the outdoor reference pressures, such as an average).

By way of example, if Equation 11 had been repeated for the unknown third height difference $dh_3$ in place of the first height difference $dh_1$, the assumed third outdoor temperature $T_{out3}$ in place of the first outdoor temperature $T_{out1}$ (and preferably equal to the second indoor temperature $T_{in2}$), and an unknown outdoor reference pressure $P_3$ (e.g., mean sea-level pressure) in place of the outdoor reference pressure for the first time period $P_1$, then the unknown third height difference $dh_3$ would be determined as follows:

$$dh_3 = \frac{dh_2 \times T_{out3} - \frac{dh_1 \times T_{out2} - dh_2 \times T_{out1}}{T_{out2} - T_{out1}} \times (T_{out3} - T_{out2})}{T_{out2}},$$ (Equation 16a)

and $$dh_3 = \frac{dh_1 \times T_{out3} - \frac{dh_1 \times T_{out2} - dh_2 \times T_{out1}}{T_{out2} \times T_{out1} \times (\Delta T_1 - \Delta T_2)} \times (\Delta T_1 - \Delta T_3) \times T_{out3} \times T_{out1}}{T_{out1}}.$$ (Equation 16b)

Different approaches for using Equation 15 or Equation 16 to estimate a difference in height between two floors in a building for use in estimating a height or an altitude of one of the two floors are described below with reference to FIG. 5. As a result, differences in altitude between a first floor and a second floor can be estimated during two time periods when indoor temperatures are the same or within a threshold amount of temperature from each other, and when outdoor temperatures optionally vary. The differences in altitude can be used to estimate a more-accurate difference in altitude between the first floor and the second floor.

Figure 5:
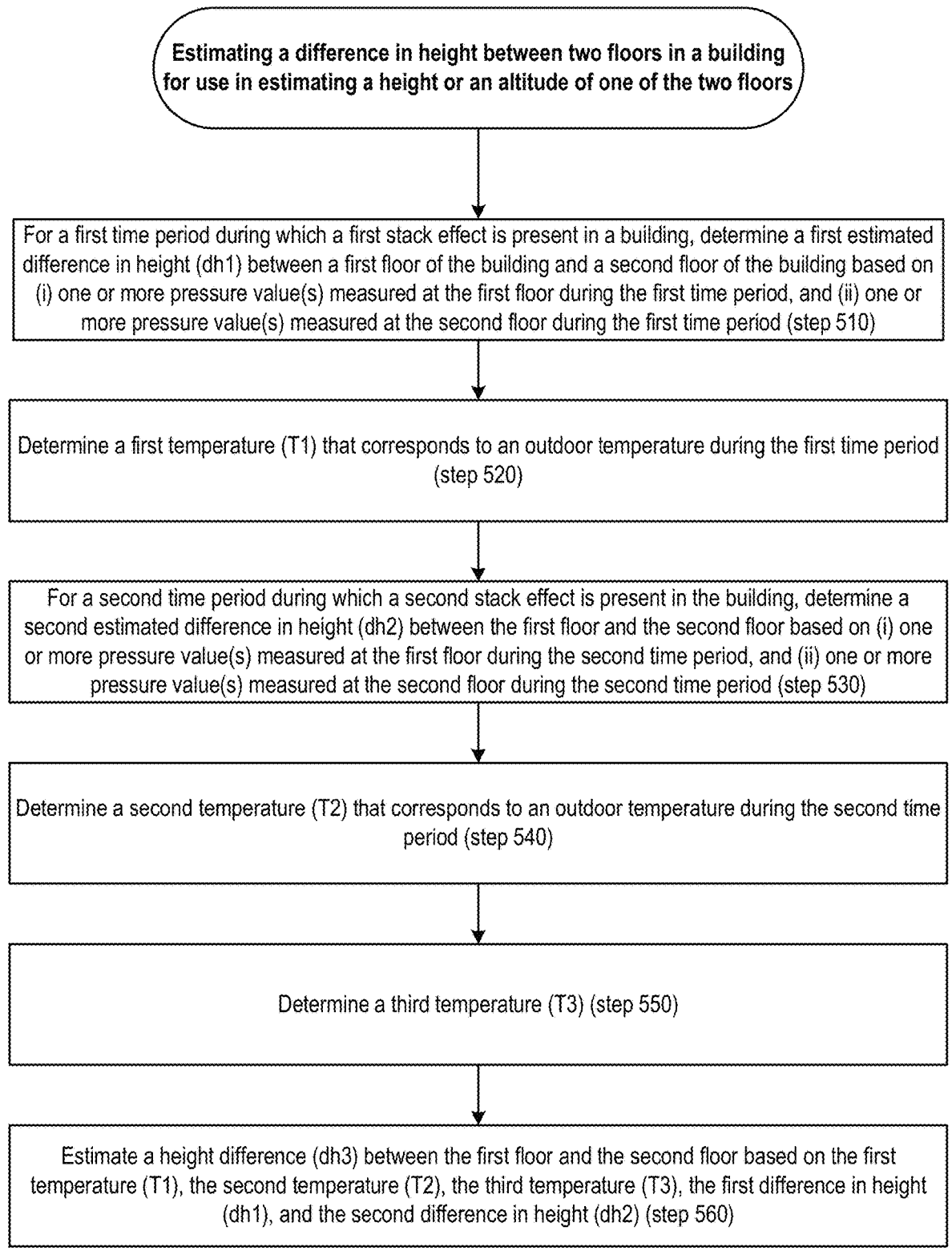
FIG. 5 depicts a process for estimating a difference in height between two floors in a building for use in estimating a height or an altitude of one of the two floors.

Estimating a Difference in Height Between Two Floors in a Building for Use in Estimating a Height or an Altitude of One of the Two Floors A process for estimating a difference in height between two floors in a building for use in estimating a height or an altitude of one of the two floors is shown in FIG. 5. The difference in height may be set to equal a difference in estimated altitudes of the two floors.

By way of example, the process of FIG. 5 can be performed using a server, a computer of an enterprise, or other suitable machine(s).

A first estimated difference in height (dh1) between a first floor of the building and a second floor of the building is determined for a first time period during which a first stack effect is present in a building (step 510). The first estimated difference in height (dh1) is based on (i) one or more pressure value(s) measured at the first floor during the first time period, and (ii) one or more pressure value(s) measured at the second floor during the first time period. Different embodiments of step 510 are provided in FIG. 6A, FIG. 6B, and FIG. 6C.

A first temperature (T1) that corresponds to an outdoor temperature during the first time period is determined (step 520).

A second estimated difference in height (dh2) between the first floor and the second floor is determined for a second time period during which a second stack effect is present in the building (step 530). The second estimated difference in height (dh2) is based on (i) one or more pressure value(s) measured at the first floor during the second time period, and (ii) one or more pressure value(s) measured at the second floor during the second time period. Different embodiments of step 530 are provided in FIG. 6A, FIG. 6B, and FIG. 6C.

A second temperature (T2) that corresponds to an outdoor temperature during the second time period is determined (step 540).

The length of the first time period and the length of the second time periods can be different in different embodiments. Each time period may depend on outdoor temperature variation in an environment in which the building is located, such as an amount of time during which measured outdoor temperature remains constant or differs by no more than a threshold amount of temperature (e.g., less than 2 degrees of a temperature unit of measurement). During the time period, pressure measurements are determined by mobile device(s) on the first floor and the second floor, and then used as later described herein. Different periods of different outdoor temperature and/or indoor temperature are desirable. When the indoor temperatures of the two time periods are desired to be the same or within a threshold amount of temperature of each other, then different periods of different outdoor temperature are desired.

In one embodiment of FIG. 5, indoor temperatures of the first and second floors during the first time period and the second time period are required to be the same or within a threshold difference in indoor temperature from each other (e.g., less than 2 degrees of a temperature unit of measurement). In this embodiment, an additional step occurs before step 530, during which a first indoor temperature of the first time period is compared to another indoor temperature of another time period. If the first indoor temperature and the other indoor temperature are equal or within the threshold difference in indoor temperature from each other, then the other time period is the second time period and steps 530 and 540 occur. If the first indoor temperature and the other indoor temperature are not equal or within the threshold difference in indoor temperature from each other, then the other time period is not second time period, and the additional step is repeated for yet another time period.

Each of the first temperature and the second temperature is preferably a constant outdoor temperature during the respective time period, which may be measured by one or more reference temperature sensors. The first temperature and the second temperature are expected to be different. If a threshold amount of temperature variation is permitted during the respective time period, then the respective outdoor temperature for that time period may be an average or another combination of temperatures measured during that time period.

A third temperature (T3) is also determined (step 550). The third temperature may be any value of temperature in theory, but preferably reflects circumstances when there would be no or minimal stack effect impacting altitude estimates that are based on pressure from inside the building—i.e., when temperatures inside and outside the building are equal or within a tolerated difference of indoor and outdoor temperature (e.g., <2 degrees Kelvin) from each other. In one embodiment, the third temperature is derived from actual measurement(s) of temperature inside the building when difference(s) in height between the first floor and the second floor was/were determined (e.g., the first temperature or the second temperature; e.g., a mathematical combination like an average of the first temperature and the second temperature). In another embodiment, the third temperature is an indoor temperature designated for the building—e.g., a temperature designated by a requirement for an HVAC indoor environment design of the building during times of day that match times of day in the first time period and/or the second time period, which is publicly or privately obtained from a data source.

Finally, a height difference (dh3) between the first floor and the second floor is estimated based on the first temperature (T1), the second temperature (T2), the third temperature (T3), the first difference in height (dh1), and the second difference in height (dh2) (step 560). Different embodiments of step 560 are provided in FIG. 7A and FIG. 7B.

If the first floor is known to be a ground-level floor, the height difference (dh3) is used as the height of the second floor above ground. Alternatively, if the first floor is above ground terrain and its altitude above the ground terrain is known, the height difference (dh3) is combined with the known altitude of the first floor to determine the height of the second floor above ground terrain (e.g., added to the known altitude if the cluster altitude for the first floor is less than the cluster altitude of the second floor; e.g., subtracted from the known altitude if the cluster altitude for the first floor is greater than the cluster altitude of the second floor). As discussed later with respect to FIG. 8, the height difference (dh3) can be used to determine an altitude of the second floor when the altitude of the first floor is known regardless of whether the building is influenced by a stack effect.

Determine an Estimated Difference in Height Between Two Floors Based on Pressure Value(s) Measured at the Floors During a Time Period (Step 510, Step 530)

Figure 6A:
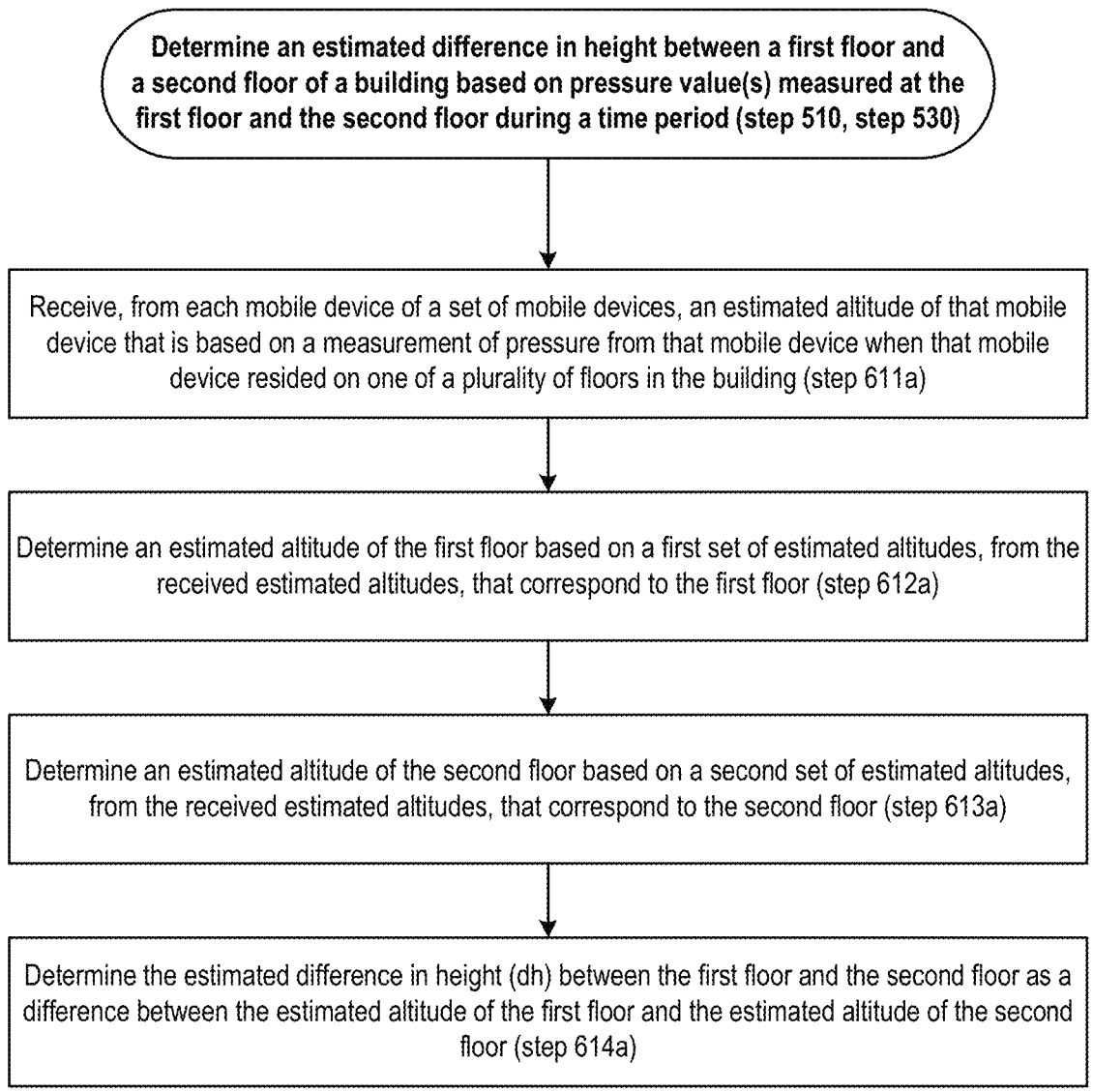
FIG. 6A, FIG. 6B and FIG. 6C each depict a process for determining an estimated difference in height between a first floor and a second floor of a building based on pressure value(s) measured at the first floor and the second floor during a time period.

A process for determining an estimated difference in height between a first floor and a second floor of a building based on pressure value(s) measured at the first floor and the second floor during a time period is shown in FIG. 6A. Such a process may be performed during step 510 and step 530 of FIG. 5 for the respective time periods of those steps. As shown in FIG. 6A, for each mobile device of a set of one or more mobile devices, an estimated altitude of that mobile device that is based on a measurement of pressure from that mobile device when that mobile device resided on one of a plurality of floors in the building is received (step 611a)—e.g., received by a machine, such as a server or other processing device. A first set of estimated altitudes that correspond to the first floor are identified from the received estimated altitudes, and an estimated altitude of the first floor is determined based on the first set of altitudes (step 612a). A second set of estimated altitudes that correspond to the second floor are identified from the received estimated altitudes, and an estimated altitude of the second floor is determined based on the second set of altitudes (step 613a). The estimated difference in height (dh) between the first floor and the second floor is determined as a difference between the estimated altitude of the first floor and the estimated altitude of the second floor (step 614a).

In an alternative embodiment for step 611a, the estimated altitude need not be based on a measured pressure, and instead could be determined using other approaches, liking using ranging signals from terrestrial transmitters or GNSS satellites, using Wi-Fi positioning techniques, or using any other known technology for estimating altitudes.

Identification of sets of estimated altitudes that correspond to a particular floor during step 612a and step 613a may be accomplished using different approaches. In one embodiment, any known data clustering technique may be used to determine different sets of estimated altitudes, where each set is assigned a different cluster number that represents a different floor number, and where ascending cluster numbers may be in order of ascending altitude values of the sets. For example, each of the estimated altitudes in the set may be identified as being within a threshold distance in altitude from all other estimated altitudes in the set, and the altitude value of the set (i.e., an estimated altitude for a floor number corresponding to the set) may be determined using different approaches. In one embodiment, an average altitude of the estimated altitudes in the set is determined, and the estimated altitude of the floor number is set to the average altitude. In another embodiment, the most-common altitude of the estimated altitudes in the set is determined, and the estimated altitude of the floor number is set to the most-common altitude. In either embodiment, outliers in the identified set may be detected using known approaches and removed from consideration when determining the estimated altitude of the floor number.

Figure 6B:
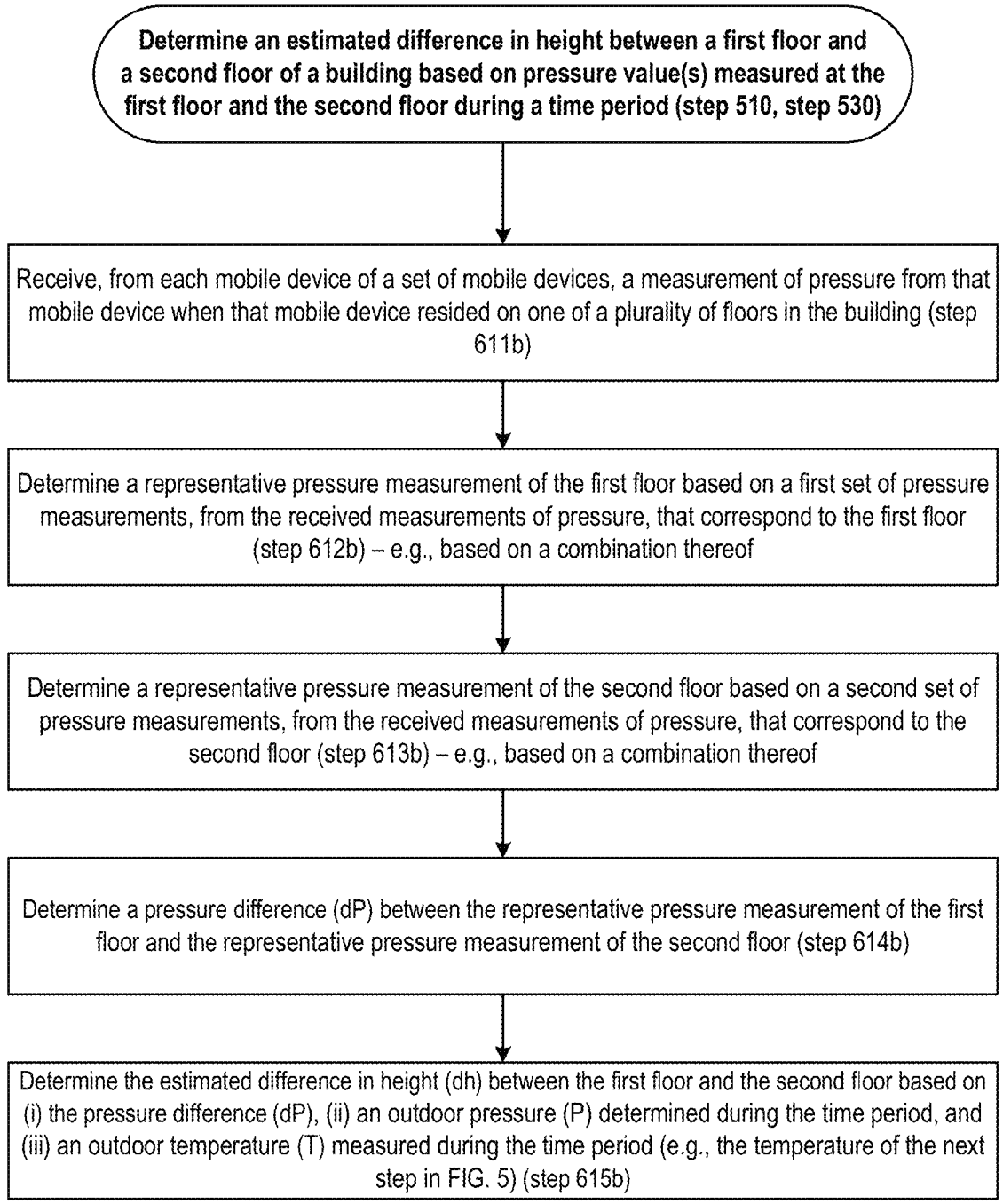

Another process for determining an estimated difference in height between a first floor and a second floor of a building based on pressure value(s) measured at the first floor and the second floor during a time period is shown in FIG. 6B. Such a process may be performed during step 510 and step 530 of FIG. 5 for the respective time periods of those steps. As shown in FIG. 6B, for each mobile device of a set of mobile devices, a measurement of pressure from that mobile device when that mobile device resided on one of a plurality of floors in the building is received (step 611b)—e.g., received by a machine, such as a server or other processing device. A first set of pressure measurements that correspond to the first floor are identified from the received measurements of pressure, and a representative pressure at the first floor (P1) is determined based on the first set of pressure measurements (step 612a). A second set of pressure measurements that correspond to the second floor are identified from the received measurements of pressure, and a representative pressure at the second floor (P2) is determined based on the second set of pressure measurements (step 613a). A pressure difference (dP) between the representative pressure measurement of the first floor (P1) and the representative pressure measurement of the second floor (P2) is determined (step 614b)—e.g., dP=|P1−P2|. The estimated difference in height (dh) between the first floor and the second floor is determined based on: (i) the pressure difference (dP); (ii) an outdoor reference pressure (P) determined during the time period (e.g., a mean sea-level pressure determined from one or more pressure measurements of one or more reference pressure sensors); and (iii) an outdoor temperature (T) measured during the time period (e.g., in Kelvin), such as the temperature of step 520 or 540 in FIG. 5 (step 615b). In one embodiment of step 615b, the estimated difference in height (dh) is determined as follows:

$$dh = -dP \times \frac{R \times T}{g \times M \times P}, \qquad \text{(Equation 17)}$$

where g corresponds to the acceleration due to gravity, R is a gas constant, and M is molar mass of air (e.g., dry air or other).

Identification of sets of pressure measurements that correspond to a particular floor during step 612b and step 613b may be accomplished using different approaches. In one embodiment, any known data clustering technique may be used to determine different sets of pressure measurements, where each set is assigned a different cluster number that represents a different floor number, and where ascending cluster numbers may be in order of descending pressure values of the sets. For example, each of the pressure measurements in a set may be identified as being within a threshold amount of pressure from all other pressure measurements in the set, and the pressure value of the set (i.e., a representative pressure of a floor number corresponding to the set) may be determined using different approaches. In one embodiment, an average pressure of the pressure measurements in the set is determined, and the representative pressure at the floor number is set to the average pressure. In another embodiment, the most-common pressure of the pressure measurements in the set is determined, and the representative pressure at the floor number is set to the most-common pressure. In either embodiment, outliers in the identified set may be detected using known approaches and removed from consideration when determining the representative pressure at the floor number.

Figure 6C:
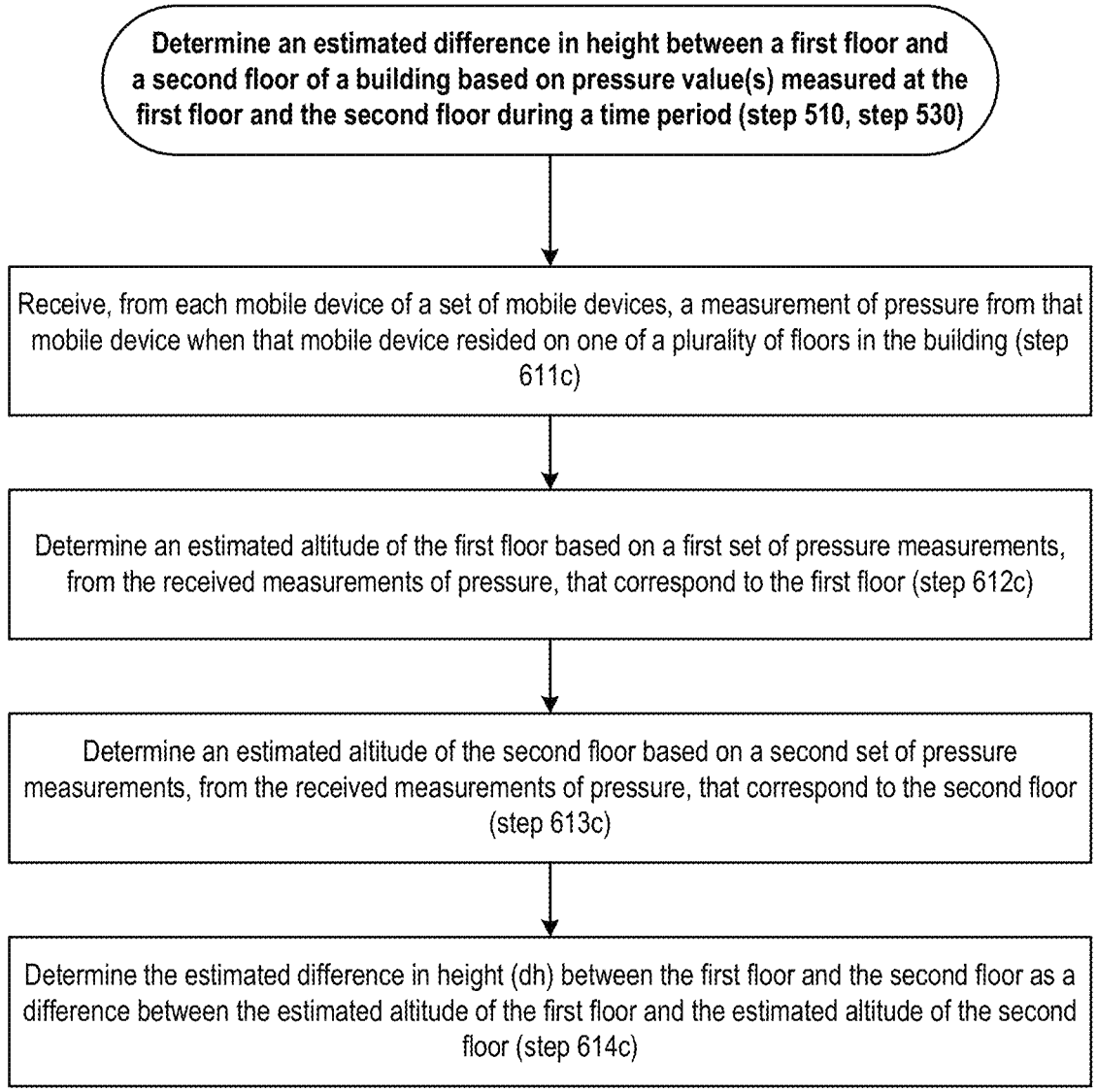

Yet another process for determining an estimated difference in height between a first floor and a second floor of a building based on pressure value(s) measured at the first floor and the second floor during a time period is shown in FIG. 6C. Such a process may be performed during step 510 and step 530 of FIG. 5 for the respective time periods of those steps. As shown in FIG. 6C, for each mobile device of a set of mobile devices, a measurement of pressure from that mobile device when that mobile device resided on one of a plurality of floors in the building is received (step 611c)—e.g., received by a machine, such as a server or other processing device. An estimated altitude of the first floor is determined based on a first set of pressure measurements that correspond to the first floor as identified from the received measurements of pressure (step 612c). An estimated altitude of the second floor is determined based on a second set of pressure measurements that correspond to the second floor as identified from the received measurements of pressure (step 613c). The estimated difference in height (dh) between the first floor and the second floor is determined as a difference between the estimated altitude of the first floor and the estimated altitude of the second floor (step 614c).

Identification of sets of pressure measurements that correspond to a particular floor during step 612c and step 613c may be accomplished using different approaches. In one embodiment, any known data clustering technique may be used to determine different sets of pressure measurements, where each set is assigned a different cluster number that represents a different floor number, and where ascending cluster numbers may be in order of descending pressure values of the sets. For example, each of the pressure measurements in a set may be identified as being within a threshold amount of pressure from all other pressure measurements in the set. In one embodiment of step 612c and step 613c, an estimated altitude is computed for each pressure measurement in the corresponding set (e.g., by inputting the pressure measurement into the barometric formula of equation 1 along with a reference altitude, a reference pressure determined for the reference altitude, and a measured reference temperature for the time period), and the computed estimated altitudes are combined (e.g., averaged) to determine the estimated altitude of the corresponding floor. In another embodiment of step 612c and 613c, a representative pressure measurement of the corresponding floor is determined, and the estimated altitude of that floor is computed using the representative pressure measurement (e.g., inputting the representative pressure measurement into the barometric formula of equation 1 along with a reference altitude, a reference pressure determined for the reference altitude, and a measured reference temperature for the time period).

Estimate a Height Difference Between Two Floors
(Step 560)

Figure 7A:
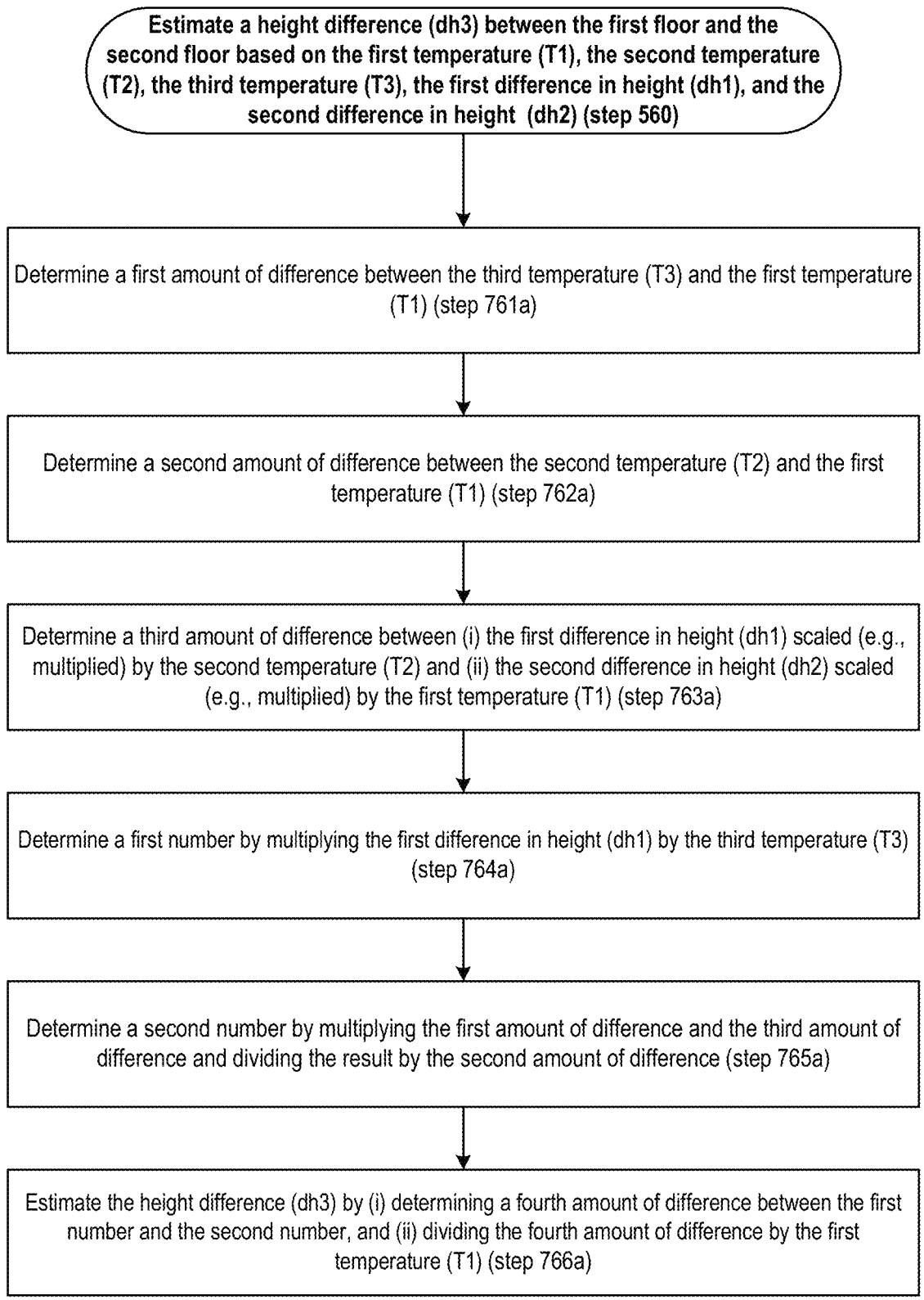
FIG. 7A and FIG. 7B each depict a process for estimating a height difference between a first floor and a second floor based on three temperatures and two estimated differences in height between the first floor and the second floor.

A process for estimating a height difference (dh3) between the first floor and the second floor based on the first temperature (T1), the second temperature (T2), the third temperature (T3), the first difference in height (dh1), and the second difference in height (dh2) is shown in FIG. 7A. Such a process may be performed during step 560 of FIG. 5. As shown in FIG. 7A, a first amount of difference between the third temperature (T3) and the first temperature (T1) is determined (step 761a)—e.g., as follows: $T_3-T_1$. A second amount of difference between the second temperature (T2) and the first temperature (T1) is determined (step 762a)—e.g., as follows: $T_2-T_1$. A third amount of difference between (i) the first difference in height (dh1) multiplied by the second temperature (T2) and (ii) the second difference in height (dh2) multiplied by the first temperature (T1) is determined (step 763a)—e.g., as follows: $dh_1 \times T_2 - dh_2 \times T_1$. A first number is determined by multiplying the first difference in height (dh1) by the third temperature (T3) (step 764a)—e.g., as follows: $dh_1 \times T_3$. A second number is determined by multiplying the first amount of difference and the third amount of difference and dividing the result by the second amount of difference (step 765a)—e.g., as follows:

$$\frac{(dh_1 \times T_2 - dh_2 \times T_1) \times (T_3 - T_1)}{T_2 - T_1}. \qquad \text{(Equation 18)}$$

The height difference (dh3) is determined by (i) determining a fourth amount of difference between the first number and the second number, and (ii) dividing the fourth amount of difference by the first temperature (T1) (step 766a)—e.g., as follows:

$$\frac{dh_1 \times T_3 - \dfrac{dh_1 \times T_2 - dh_2 \times T_1}{T_2 - T_1} \times (T_3 - T_1)}{T_1}. \qquad \text{(Equation 19)}$$

Figure 7B:
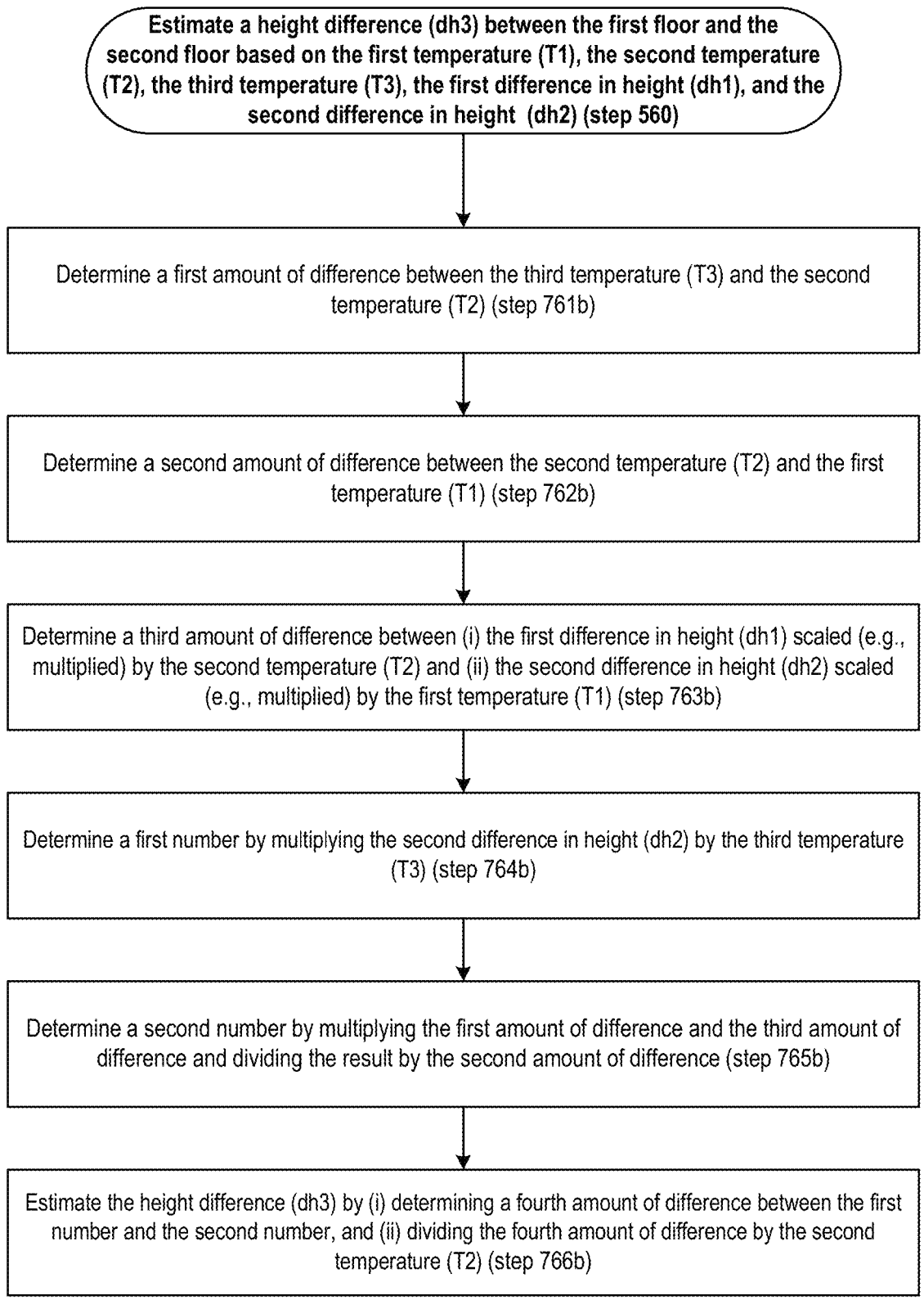

Another process for estimating a height difference (dh3) between the first floor and the second floor based on the first temperature (T1), the second temperature (T2), the third temperature (T3), the first difference in height (dh1), and the second difference in height (dh2) is shown in FIG. 7B. Such a process may be performed during step 560 of FIG. 5. As shown in FIG. 7B, a first amount of difference between the third temperature (T3) and the second temperature (T2) is determined (step 761b)—e.g., as follows: $T_3-T_2$. A second amount of difference between the second temperature (T2) and the first temperature (T1) is determined (step 762b)—e.g., as follows: $T_2-T_1$. A third amount of difference between (i) the first difference in height (dh1) multiplied by the second temperature (T2) and (ii) the second difference in height (dh2) multiplied by the first temperature (T1) is determined (step 763b)—e.g., as follows: $dh_1 \times T_2 - dh_2 \times T_1$.

A first number is determined by multiplying the second difference in height (dh2) by the third temperature (T3) (step 764b)—e.g., as follows: $dh_2 \times T_3$. A second number is determined by multiplying the first amount of difference and the third amount of difference and dividing the result by the second amount of difference (step 765b)—e.g., as follows:

$$\frac{(dh_1 \times T_2 - dh_2 \times T_1) \times (T_3 - T_2)}{T_2 - T_1}. \qquad \text{(Equation 20)}$$

The height difference (dh3) by (i) determining a fourth amount of difference between the first number and the second number, and (ii) dividing the fourth amount of difference by the second temperature (T2) (step 766b)—e.g., as follows:

$$\frac{dh_2 \times T_3 - \frac{dh_1 \times T_2 - dh_2 \times T_1}{T_2 - T_1} \times (T_3 - T_2)}{T_2}. \qquad \text{(Equation 21)}$$

Figure 8:
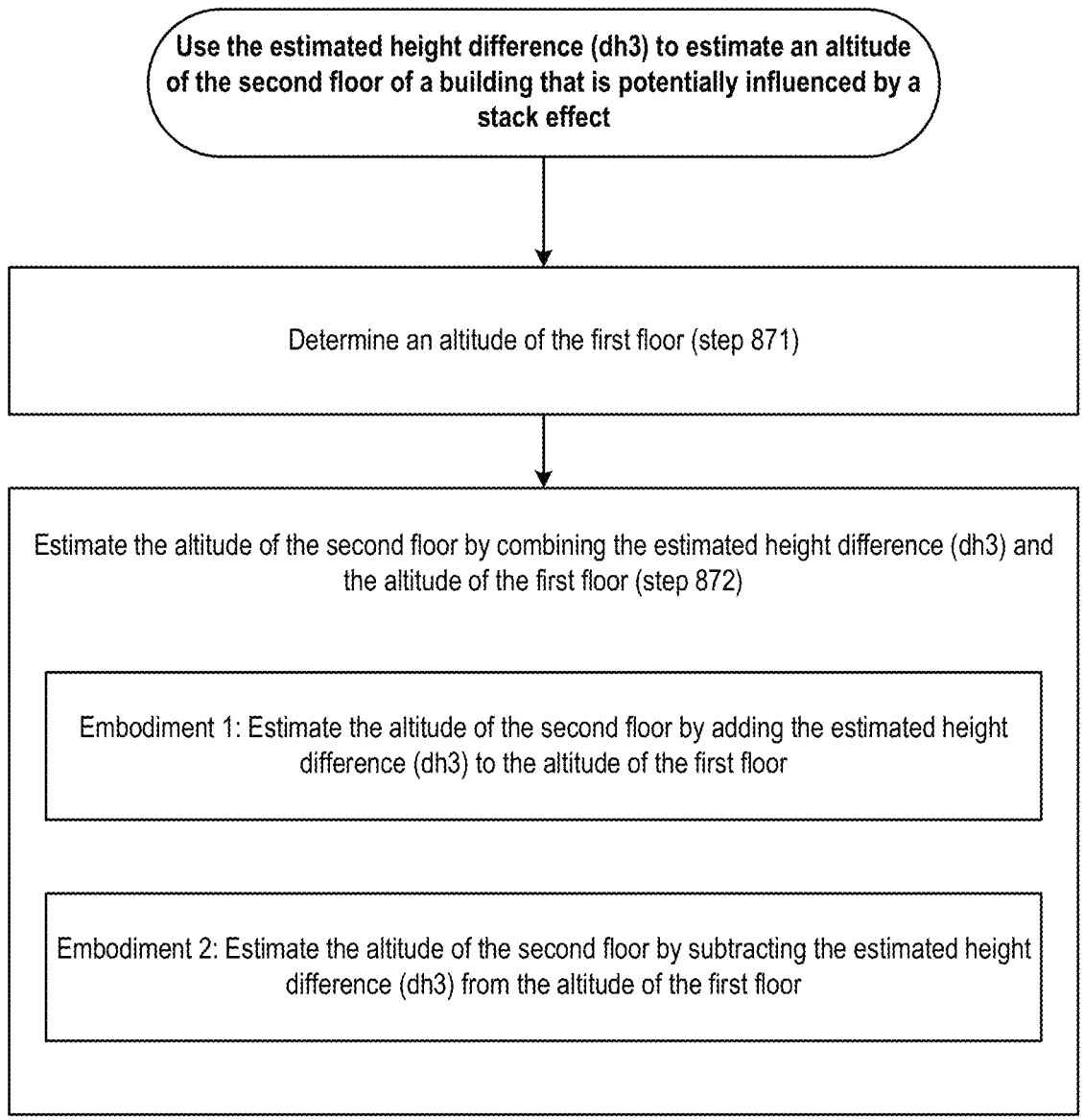
FIG. 8 depicts a process for using an estimated height difference between a first floor and a second floor to estimate an altitude of the second floor.

Use the Estimated Height Difference to Estimate an Altitude of the Second Floor of a Building A process for using the height difference (dh3) to estimate an altitude of the second floor is shown in FIG. 8. This process may be carried out when the building is potentially influenced by a stack effect.

By way of example, the process of FIG. 8 can be performed using a server, a computer of an enterprise, or other suitable machine(s).

An altitude of the first floor is determined (step 871). The altitude of the first floor is assumed to be available from a data source. For example, the altitude could be an altitude of ground terrain around the building when the first floor is the ground-level floor of the building, or it could be derived from available LIDAR data of building heights. In some embodiments, the floor number of the first floor is determined, and the floor number is used to look up a known altitude of the first floor from a data source. Different approaches may be used to determine the floor number—e.g., the floor number may be determined to be a ground-level floor number when estimated altitudes of mobile devices corresponding to the first floor are within a threshold amount of altitude from a known ground altitude; e.g., the floor number may be determined to be a ground-level floor number when measured pressures from mobile devices corresponding to the first floor are within a threshold amount of pressure from a known pressure of a known altitude corresponding to ground terrain; e.g., the floor number may be identified when one of the mobile devices connects to a network associated with the floor number; e.g., the floor number may be identified by a user of a mobile device as a floor at which the user resided; or e.g., the floor number may be associated with a geo-fence through which one of the mobile devices entered when on the first floor. Once determined, the floor number can be used to look up the altitude of that floor number.

The altitude of the second floor is estimated by combining the estimated height difference (dh3) and the altitude of the first floor (step 872). One embodiment of step 872 estimates the altitude of the second floor by adding the estimated height difference (dh3) to the altitude of the first floor (e.g., when the first floor is lower than the second floor). Another embodiment of step 872 estimates the altitude of the second floor by subtracting the estimated height difference (dh3) from the altitude of the first floor (e.g., when the first floor is higher than the second floor).

Technical Benefits

Mobile devices can be used to estimate or "survey" altitudes floors in buildings based on (i) reference pressures from a network of reference pressure sensors and (ii) measurements of pressure from pressure sensors of the mobile devices. However, conventional approaches for estimating altitudes can produce inaccurate estimates of altitude in pressurized buildings (e.g., building affected by stack effect) . Improvements to the functionality of conventional approaches in support of better (e.g., more reliable, accurate and/or available) altitude estimates is highly desirable, and the processes described herein include concrete and particular ways that permit use of crowd-sourced, pressure-based estimated altitudes of mobile devices when pressurization inside the building fluctuates. As a result, more accurate estimates of floor heights or altitudes are possible compared to other approaches that do not account for fluctuating pressurization.

Other Aspects

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 9:
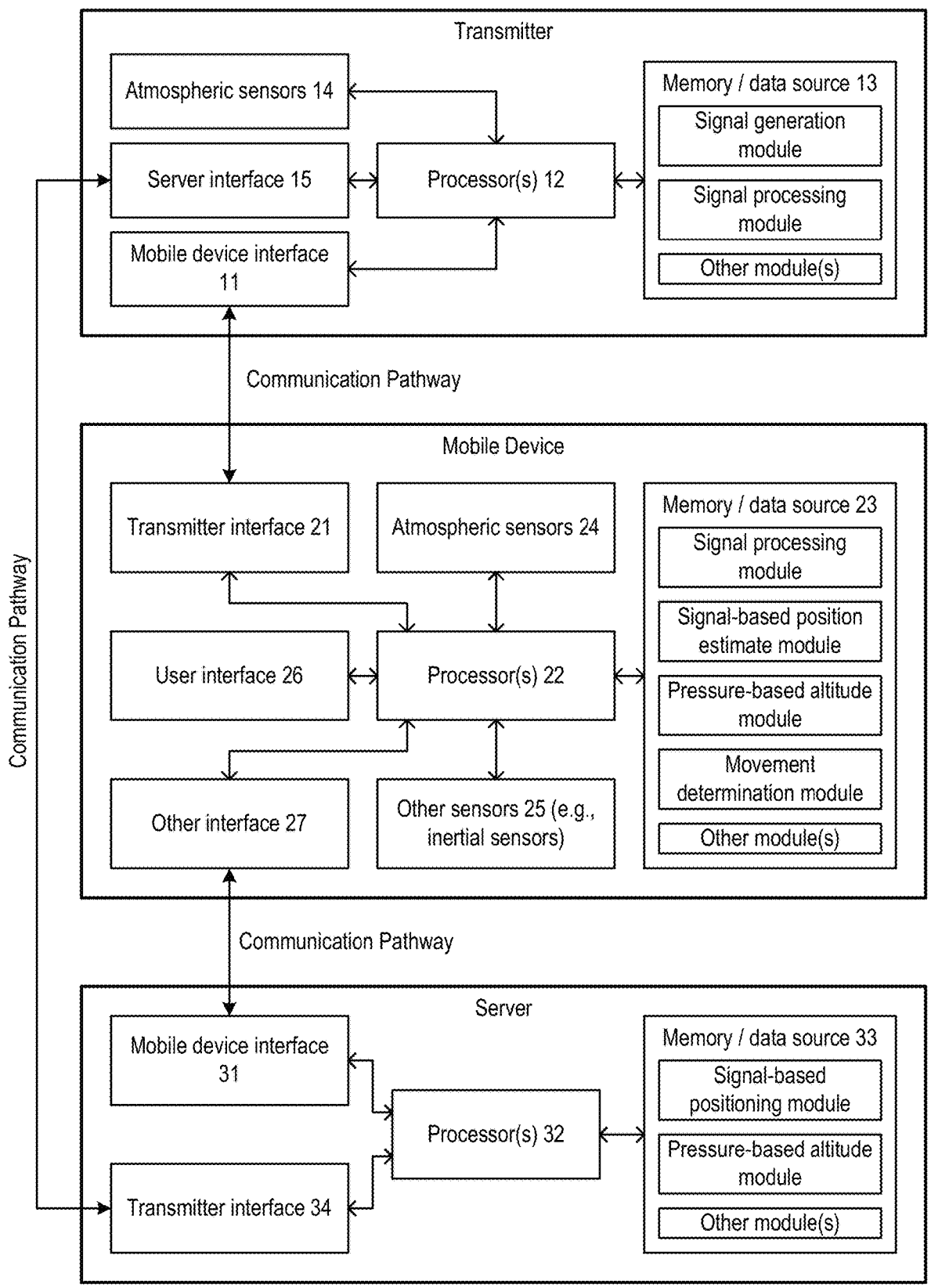
FIG. 9 illustrates components of a transmitter, a mobile device, and a server.

FIG. 9 illustrates components of a transmitter, a mobile device, and a server. Examples of communication pathways are shown by arrows between components.

By way of example in FIG. 9, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 9, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 9, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

The invention claimed is:

1. A method comprising:
for a first time period, determining, by a processor, a first estimated difference in height between a first floor of a building and a second floor of the building based on a first pressure value measured at the first floor during the first time period by a mobile device, and a second pressure value measured at the second floor during the first time period by the mobile device;
determining, by the processor, a first temperature that corresponds to an outdoor temperature during the first time period;
for a second time period, determining, by the processor, a second estimated difference in height between the first floor and the second floor based on a third pressure value measured at the first floor during the second time period by the mobile device, and a fourth pressure value measured at the second floor during the second time period by the mobile device;
determining, by the processor, a second temperature that corresponds to an outdoor temperature during the second time period;
determining, by the processor, a third temperature that reflects a circumstance when there is no or minimal stack effect in the building;
estimating, by the processor, a height difference between the first floor and the second floor based on the first temperature, the second temperature, the third temperature, the first estimated difference in height, and the second estimated difference in height;
determining, by the processor, a first altitude that corresponds to the first floor; and
estimating, by the processor, a second altitude that corresponds to the second floor by combining the height difference and the first altitude of the first floor;
and wherein the first time period and the second time period are different.

2. The method of claim 1, wherein determining the third temperature comprises:
determining, by the processor, an indoor temperature of the building during the first time period; and
setting, by the processor, the third temperature equal to the indoor temperature of the building during the first time period.

3. The method of claim 1, wherein determining the third temperature comprises:
determining, by the processor, an indoor temperature of the building during the second time period; and
setting, by the processor, the third temperature equal to the indoor temperature of the building during the second time period.

4. The method of claim 1, wherein determining the third temperature comprises:
determining, by the processor, a first indoor temperature of the building during the first time period;
determining, by the processor, a second indoor temperature of the building during the second time period;
determining, by the processor, a temperature value based on a combination of the first indoor temperature and the second indoor temperature; and
setting, by the processor, the third temperature equal to the determined temperature value.

5. The method of claim 1, wherein determining the third temperature comprises:
determining, by the processor, an indoor temperature designated for the building; and
setting, by the processor, the third temperature equal to the indoor temperature designated for the building.

6. The method of claim 1, wherein the mobile device is one of a plurality of mobile devices, and wherein determining the first estimated difference in height between the first floor and the second floor comprises:
receiving, by the processor from each mobile device of the plurality of mobile devices, an estimated altitude of that mobile device that is based on a measurement of pressure from that mobile device when that mobile device resided on one of a plurality of floors in the building during the first time period;
identifying, by the processor from the received estimated altitudes, a first set of estimated altitudes that correspond to the first floor;
determining, by the processor, an estimated altitude of the first floor based on the first set of estimated altitudes;
identifying, by the processor from the received estimated altitudes, a second set of estimated altitudes that correspond to the second floor;
determining, by the processor, an estimated altitude of the second floor based on the second set of estimated altitudes; and
determining, by the processor, the first estimated difference in height between the first floor and the second floor as a difference between the estimated altitude of the first floor and the estimated altitude of the second floor.

7. The method of claim 1, wherein the mobile device is one of a plurality of mobile devices, and wherein determining the first estimated difference in height between the first floor and the second floor comprises:
receiving, by the processor from each mobile device of the plurality of mobile devices, a measurement of pressure from that mobile device when that mobile device resided on one of a plurality of floors in the building during the first time period;

identifying, by the processor from the received measurements of pressure, a first set of pressure measurements that correspond to the first floor;

determining, by the processor, a representative pressure measurement of the first floor based on the first set of pressure measurements;

identifying, by the processor from the received measurements of pressure, a second set of pressure measurements that correspond to the second floor;

determining, by the processor, a representative pressure measurement of the second floor based on the second set of pressure measurements;

determining, by the processor, a pressure difference between the representative pressure measurement of the first floor and the representative pressure measurement of the second floor; and determining, by the processor, the first estimated difference in height between the first floor and the second floor based on (i) the pressure difference, (ii) an outdoor pressure determined during the first time period, and (iii) the outdoor temperature measured during the first time period.

8. The method of claim 1, wherein the mobile device is one of a plurality of mobile devices, and wherein determining the first estimated difference in height between the first floor and the second floor comprises:

receiving, by the processor from each mobile device of the plurality of mobile devices, a measurement of pressure from that mobile device when that mobile device resided on one of a plurality of floors in the building during the first time period;

identifying, by the processor from the received measurements of pressure, a first set of pressure measurements that correspond to the first floor;

determining, by the processor, an estimated altitude of the first floor based on the first set of pressure measurements;

identifying, by the processor from the received measurements of pressure, a second set of pressure measurements that correspond to the second floor;

determining, by the processor, an estimated altitude of the second floor based on the second set of pressure measurements; and determining, by the processor, the first estimated difference in height between the first floor and the second floor as a difference between the estimated altitude of the first floor and the estimated altitude of the second floor.

9. The method of claim 1, wherein estimating a height difference between the first floor and the second floor based on the first temperature, the second temperature, the third temperature, the first estimated difference in height, and the second estimated difference in height comprises:

determining, by the processor, a first amount of difference between the third temperature and the first temperature;

determining, by the processor, a second amount of difference between the second temperature and the first temperature;

determining, by the processor, a third amount of difference between (i) the first estimated difference in height multiplied by the second temperature and (ii) the second estimated difference in height multiplied by the first temperature;

determining, by the processor, a first number by multiplying the first estimated difference in height by the third temperature;

determining, by the processor, a second number by multiplying the first amount of difference and the third amount of difference and dividing the result by the second amount of difference; and estimating, by the processor, the height difference by (i) determining a fourth amount of difference between the first number and the second number, and (ii) dividing the fourth amount of difference by the first temperature.

10. The method of claim 1, wherein estimating a height difference between the first floor and the second floor based on the first temperature, the second temperature, the third temperature, the first estimated difference in height, and the second estimated difference in height comprises:

determining, by the processor, a first amount of difference between the third temperature and the second temperature;

determining, by the processor, a second amount of difference between the second temperature and the first temperature;

determining, by the processor, a third amount of difference between (i) the first estimated difference in height multiplied by the second temperature and (ii) the second estimated difference in height multiplied by the first temperature;

determining, by the processor, a first number by multiplying the second estimated difference in height by the third temperature;

determining, by the processor, a second number by multiplying the first amount of difference and the third amount of difference and dividing the result by the second amount of difference; and estimating, by the processor, the height difference by (i) determining a fourth amount of difference between the first number and the second number, and (ii) dividing the fourth amount of difference by the second temperature.

11. The method of claim 1, wherein the method further comprises estimating a height of the second floor above a ground-level floor of the building by:

determining, by the processor, that the first floor is the ground-level floor; and setting, by the processor, the height of the second floor above the ground-level floor of the building as the estimated height difference.

12. The method of claim 1, wherein the method further comprises estimating an altitude of the second floor by:

determining, by the processor, an altitude of the first floor;

combining, by the processor, the estimated height difference and the altitude of the first floor; and setting, by the processor, the altitude of the second floor as the combination of the estimated height difference and the altitude of the first floor.

13. One or more non-transitory machine-readable media embodying program instructions that, when executed by one or more machines, cause the one or more machines to implement the method of claim 1.

14. A system comprising one or more machines configured to perform the method of claim 1.

* * * * *